US012809498B2

(12) United States Patent
Wang et al.

(10) Patent No.: US 12,809,498 B2
(45) Date of Patent: Nov. 24, 2026

(54) IMAGE DISPLAY METHOD AND APPARATUS, DEVICE, AND MEDIUM

(71) Applicant: Beijing Zitiao Network Technology Co., Ltd., Beijing (CN)

(72) Inventors: Dongyun Wang, Beijing (CN); Jingchi Lu, Beijing (CN); Yi Ding, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 510 days.

(21) Appl. No.: 18/551,982

(22) PCT Filed: Mar. 10, 2022

(86) PCT No.: PCT/CN2022/080175

§ 371 (c)(1),
(2) Date: Sep. 22, 2023

(87) PCT Pub. No.: WO2022/206335

PCT Pub. Date: Oct. 6, 2022

(65) Prior Publication Data

US 2024/0168615 A1 May 23, 2024

(30) Foreign Application Priority Data

Mar. 30, 2021 (CN) ......................... 202110340685.4

(51) Int. Cl.
*G06F 3/0484* (2022.01)
*G06F 3/0481* (2022.01)
(Continued)

(52) U.S. Cl.
CPC .......... *G06F 3/0484* (2013.01); *G06F 3/0481* (2013.01); *G06F 3/04883* (2013.01); *G06F 2203/04804* (2013.01); *H04N 23/632* (2023.01)

(58) Field of Classification Search
CPC ... G06F 3/0484; G06F 3/0481; G06F 3/04883
See application file for complete search history.

(56) References Cited

U.S. PATENT DOCUMENTS 7,559,034 B1 * 7/2009 Papemy .............. G06F 9/44526 715/803
8,358,876 B1 * 1/2013 Gilra ......................... G06T 3/04 382/173

(Continued)

FOREIGN PATENT DOCUMENTS

CN 107071574 A 8/2017
CN 107835359 A 3/2018

(Continued)

OTHER PUBLICATIONS

International Search Report and Written Opinion issued May 13, 2022 in PCT Appl. PCT/CN2022/080175, English translation (16 pages).

(Continued)

*Primary Examiner* — William L Bashore
*Assistant Examiner* — Gregory A Distefano

(57) ABSTRACT

The present disclosure relates to an image display method and apparatus, a device, and a medium. The image display method includes: displaying an initial scene image in a target interactive interface; in response to a first trigger operation, displaying a target area on the initial scene image, an area range of the target area being expanded with an increase of a display duration of the target area; and displaying a target scene image in the target area, a display size of the target scene image being enlarged with expansion of the area range of the target area.

19 Claims, 4 Drawing Sheets

(51) Int. Cl.
*G06F 3/04883* (2022.01)
*H04N 23/63* (2023.01)

(56) References Cited

U.S. PATENT DOCUMENTS

| | | | | |
|---|---|---|---|---|
| 10,761,691 | B2 * | 9/2020 | Anzures | G06T 13/00 |
| 2009/0199127 | A1 * | 8/2009 | Sareen | G06F 3/04886 715/781 |
| 2012/0113015 | A1 * | 5/2012 | Werner | G06F 3/0488 345/173 |
| 2015/0339801 | A1 * | 11/2015 | Sato | G06F 3/04845 345/648 |
| 2018/0349003 | A1 | 12/2018 | Moreno et al. | |
| 2020/0021699 | A1 * | 1/2020 | Obara | H04N 1/00411 |
| 2021/0366174 | A1 * | 11/2021 | Reilly | G06T 19/20 |

FOREIGN PATENT DOCUMENTS

| | | | |
|---|---|---|---|
| CN | 107943552 | A | 4/2018 |
| CN | 108509122 | A | 9/2018 |
| CN | 109669617 | A | 4/2019 |
| CN | 109727318 | A | 5/2019 |
| CN | 110853739 | A | 2/2020 |
| CN | 111899192 | A | 11/2020 |
| CN | 112965780 | A | 6/2021 |
| CN | 114598823 | A | 6/2022 |

OTHER PUBLICATIONS

First Office Action issued Jul. 15, 2022 in CN Appl. No. 202110340685.4, English translation (12 pages).

Second Office Action issued Feb. 25, 2023 in CN Appl. No. 202110340685.4, English translation (14 pages).

* cited by examiner

IMAGE DISPLAY METHOD AND APPARATUS, DEVICE, AND MEDIUM

CROSS-REFERENCE TO RELATED APPLICATIONS

The present application is a U.S. National Stage Application under 35 U.S.C. § 371 of International Patent Application No. PCT/CN2022/080175, filed on Mar. 10, 2022, which claims priority to China Patent Application No. 202110340685.4 filed on Mar. 30, 2021, the disclosure of both of which are incorporated by reference herein in entirety.

TECHNICAL FIELD

The present disclosure relates to an image display method, an apparatus, a device, and a medium.

BACKGROUND

With the rapid development of computer technology and mobile communication technology, various video creation platforms based on electronic devices have been widely used, which can greatly enrich people's daily lives.

Currently, various video creation platforms have successively introduced a scene transfer effect. Users can use the effect to create a video that transfers from an initial scene to a designated scene.

SUMMARY

In a first aspect, the present disclosure provides an image display method, comprising: displaying an initial scene image in a target interactive interface; displaying a target area on the initial scene image in response to a first trigger operation, an area range of the target area being expanded with an increase of a display duration of the target area; and displaying a target scene image in the target area, a display size of the target scene image being enlarged with expansion of the area range of the target area.

In a second aspect, the present disclosure provides an image display apparatus, comprising: a first display unit configured to display an initial scene image in a target interactive interface; a second display unit configured to display a target area on the initial scene image in response to a first trigger operation, an area range of the target area being expanded with an increase of a display duration of the target area; and a third display unit configured to display a target scene image in the target area, a display size of the target scene image being enlarged with expansion of the area range of the target area.

In a third aspect, the present disclosure provides an image display device, comprising: a memory configured to store executable instructions; and a processor configured to read the executable instructions from the memory and perform the executable instructions to implement the image display method described in the first aspect.

In a fourth aspect, the present disclosure provides a computer-readable storage medium having a computer program stored thereon, wherein the computer program, when executed by a processor, causes the processor to implement the image display method described in the first aspect.

In a fifth aspect, the present disclosure provides a computer program, comprising: instructions that, when executed by a processor, cause the processor to perform the image display method provided in the first aspect of the present disclosure.

In a sixth aspect, the present disclosure provides a computer program product comprising instructions that, when executed by a processor, cause the processor to perform the image display method provided in the first aspect of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Figure 1:
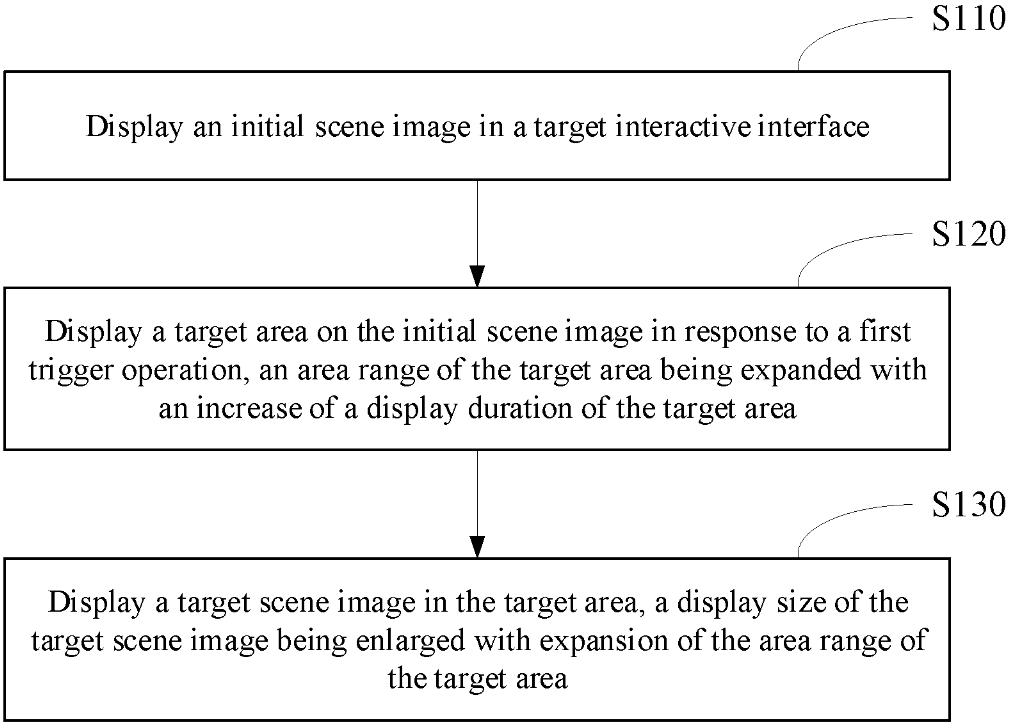
FIG. 1 is a flowchart of an image display method provided by an embodiment of the present disclosure.

Exemplary embodiments of the present disclosure will be described in detail below with reference to the accompanying drawings. Although some embodiments of the present disclosure are shown in the accompanying drawings, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the method embodiments of the present disclosure may be executed in a different order, and/or executed in parallel. In addition, the method embodiments may comprise additional steps and/or some of the illustrated steps may be omitted. The scope of the present disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts of "first", "second" and the like mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

The inventors of the present disclosure have found that in existing scene transfer effects, the process of the scene transfer is relatively rigid, which can reduce the user's sense of substitution.

In view of this, embodiments of the present disclosure provide an image display method, apparatus, device, and medium that can enhance the user's sense of substitution during the process of scene transfer.

Below, an image display method provided by an embodiment of the present disclosure will be explained with reference to FIGS. 1 to 4. In the embodiment of the present disclosure, the image display method may be performed by an electronic device. The electronic device may comprise a mobile phone, a tablet computer, a desktop computer, a notebook computer, a vehicle-mounted terminal, a wearable electronic device, a Virtual Reality (VR) device, an all-in-one computer, a smart home device, or other device with a communication function.

FIG. 1 is a flowchart of an image display method provided by an embodiment of the present disclosure.

As shown in FIG. 1, the image display method may comprise steps S110 to S130.

In step S110, an initial scene image is displayed in a target interactive interface.

In the embodiment of the present disclosure, the initial scene image displayed by an electronic device in the target interactive interface may be an image of a scene of a point of departure of a scene transfer.

In some embodiments, the initial scene image may be a scene image of a real environment in which the electronic device is located, captured in real time by a camera of the electronic device, i.e. the initial scene image may be a real-time visual scene image.

Optionally, the target interactive interface may be any display interface that can display an image captured in real time by a camera and interact with a user using the electronic device.

In an example, the target interactive interface may comprise a shooting preview interface. In another example, the target interactive interface may comprise a VR interface. Embodiments of the present disclosure do not limit this.

In other embodiments, the initial scene image may also be any scene image being displayed by the electronic device.

Optionally, the target interactive interface may be any display interface that can display an image and interact with a user using the electronic device.

In an example, the target interactive interface may comprise a game interface. In another example, the target interactive interface may also comprise a video editing interface. Embodiments of the present disclosure do not limit this.

In step S120, a target area is displayed on the initial scene image in response to a first trigger operation in the target interactive interface, an area range of the target area being expanded with an increase of a display duration of the target area.

In the embodiment of the present disclosure, when a user wants to trigger a scene traversal effect, a first trigger operation can be input. After the electronic device detects the first trigger operation, a target area having a target shape can be superimposed and displayed on the initial scene image. An area range of the target area can be expanded with an increase of a display duration of the target area, thereby achieving a hiding effect of the initial scene image.

In the embodiments of the present disclosure, the first trigger operation can be configured to trigger the electronic device to turn on the scene traversal effect function.

In some embodiments, in a case where the initial scene image is the real-time visual scene image displayed by the electronic device in the shooting preview interface, the user can make various hand gestures in the real environment where the electronic device is located. In this case, the real-time visual scene image collected by the electronic device can comprise the hand gesture made by the user, that is, the initial scene image displayed by the electronic device in the shooting preview interface may also comprise the hand gesture made by the user.

In these embodiments, the first trigger operation can comprise a first user hand gesture displayed in the shooting preview interface, wherein the first user hand gesture can be a hand gesture made by the user in a real environment to trigger the electronic device to turn on the scene traversal effect function.

Optionally, the first user hand gesture may be configured to draw a target trajectory, that is, the first user hand gesture may be a hand gesture made by the user in front of the camera of the electronic device to draw a target trajectory, a hand gesture to show victory, a hand gesture of loving heart, and so on, which is not limited in the present disclosure.

In an example, the electronic device can perform real-time hand gesture detection using the real-time visual scene image displayed in the shooting preview interface, and then display a target area on the real-time visual scene image after the first user hand gesture is detected.

In another example, the electronic device can perform real-time hand gesture detection using all real-time visual scene image displayed in the target interactive interface within a period of time, and then display a target area on a real-time visual scene image after the first user hand gesture is detected.

In other embodiments, in a case where the initial scene image is any scene image being displayed by the electronic device, the user can enter a first trigger operation in the target interactive interface. In this case, the electronic device can detect the first trigger operation made by the user in the target interactive interface and received by a touch screen of the electronic device, and display a target area on the initial scene image after the first trigger operation is detected.

In these embodiments, the first trigger operation may be the user's operation of drawing a target trajectory on the touch screen of the electronic device, and a click, long press or double-click operation on the touch screen in the process of displaying the target interactive interface by the electronic device, or an operation of triggering a button used to turn on the scene traversal effect function in the target interactive interface, which is not limited here.

In the embodiment of the present disclosure, after the electronic device detects the first trigger operation in the target interactive interface, the electronic device can acquire a display parameter of the target area, and display the target area on the initial scene image according to the acquired display parameter.

Optionally, the display parameter of the target area may comprise, but are not limited to, at least one of a shape of the target area, a display position of the target area, or a display size of the target area.

The shape of the target area may be any shape, such as a circle, polygon, heart shape, or irregular shape, etc., which is not limited here. The display position of the target area may be any position within the target interactive interface, which is not limited in the present disclosure. The display size of the target area may be any size, which is not limited in the present disclosure.

In some embodiments, the display parameter of the target area may be a fixed display parameter that are set in advance as needed.

In response to the first trigger operation in the target interactive interface, the electronic device can acquire the fixed display parameter and display the target area on the initial scene image according to the fixed display parameter.

In other embodiments, multiple sets of display parameters can be set in advance in the electronic device as needed, each set of display parameters corresponding to an operation type. The display parameters of the target area are display parameters corresponding to an operation type to which the first trigger operation belongs.

In response to the first trigger operation, the electronic device can query the display parameters corresponding to the operation type to which the first trigger operation belongs from the multiple sets of preset display parameters, and display the target area on the initial scene image according to the queried display parameters.

In some other embodiments, in a case where the first trigger operation is configured to draw a target trajectory, the display parameter of the target area can be determined according to a trajectory parameter of the target trajectory.

Optionally, the trajectory parameter can comprise, but are not limited to, a relative position of the trajectory, a relative size of the trajectory, and a shape of the trajectory.

The relative position of the trajectory may be a relative display position of the target trajectory in the target interactive interface, and the relative size of the trajectory may be a relative display size of the target trajectory in the target interactive interface.

In response to the first trigger operation, the electronic device can take the trajectory parameter as the display parameter of the target area, and display a target area on the initial scene image according to the display parameter of the target area.

In an example, in a case where the target interactive interface comprises a shooting preview interface and the first trigger operation is configured to draw a target trajectory in the shooting preview interface, before displaying the target area on the initial scene image in step S120, the image display method may further comprise: determining a display parameter of the target area according to a trajectory parameter of the target trajectory.

Accordingly, the displaying of the target area on the initial scene image in step S120 can specifically comprise: displaying the target area on the initial scene image according to the display parameter of the target area.

Specifically, in response to the first trigger operation, the electronic device can obtain a trajectory parameter of a target trajectory drawn by the first trigger operation, use the trajectory parameter as the display parameter of the target area, and superimpose and displays a target area on the initial scene image displayed in the shooting preview interface according to the display parameter of the target area.

Figure 2:
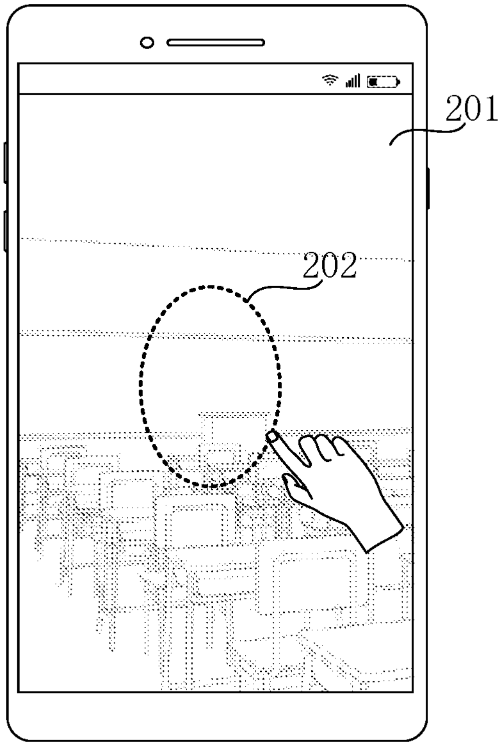
FIG. 2 is a schematic diagram of a shooting preview interface provided by an embodiment of the present disclosure.
Figure 3:
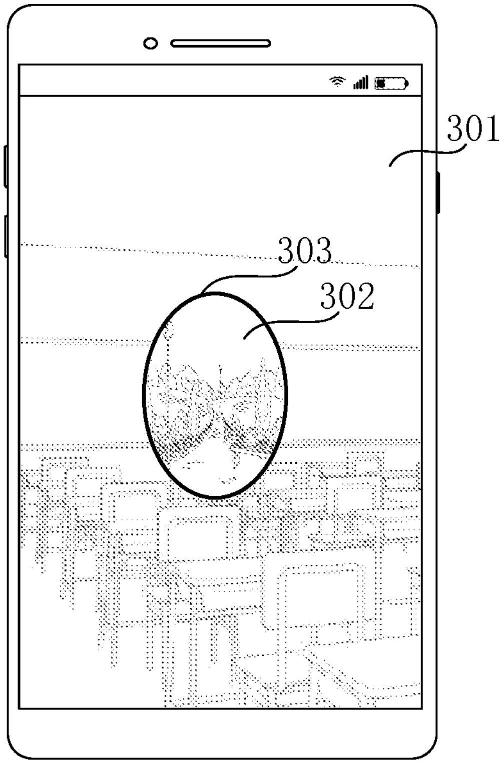
FIG. 3 is a schematic diagram of another shooting preview interface provided by an embodiment of the present disclosure.

FIG. 2 is a schematic diagram of a shooting preview interface provided by an embodiment of the present disclosure. FIG. 3 is a schematic diagram of another shooting preview interface provided by an embodiment of the present disclosure.

As shown in FIG. 2, the electronic device can display a real-time image of a classroom scene in a shooting preview interface 201. A user can draw an elliptical trajectory 202 in the classroom scene in front of a camera of a electronic device, so that the electronic device can collect a hand gesture of the user drawing the elliptical trajectory 202 in real time, thereby making the real-time image displayed in the shooting preview interface 201 comprise the hand gesture of the user drawing the elliptical trajectory 202. In addition, the electronic device can perform detection on real-time images continuously displayed in the shooting preview interface 201 within a period of time. After a hand gesture of the user drawing the elliptical trajectory 202 is detected, the interface shown in FIG. 3 is displayed.

As shown in FIG. 3, after detecting the hand gesture of the user drawing the elliptical trajectory, the electronic device can display the real-time image of the classroom scene in the shooting preview interface 301. According to the relative position and the relative position size of the elliptical trajectory drawn by the user in the shooting preview interface 301, as well as the trajectory shape of the elliptical trajectory drawn by the user, an elliptical area 302 with the same position, size and shape as the elliptical trajectory is superimposed and displayed on the real-time image of the classroom scene.

In the embodiment of the present disclosure, optionally, the target area may further comprise an area boundary pattern, such as the area boundary pattern 303 shown in FIG. 3, to better show the scene traversal effect as a "portal" on the initial scene image.

The area boundary pattern may be any dynamic pattern or static pattern designed in advance as required, which is not limited here.

In some embodiments, in a case where the area boundary pattern is a dynamic pattern, the area boundary pattern can have a dynamic effect, such as a dynamic particle effect, to enhance the science fiction feel of the scene traversal.

In an embodiment of the present disclosure, optionally, the electronic device may be preset with an enlargement ratio of the area range of the target area After the target area is displayed, the electronic device may enlarge the display size of the target area according to the enlargement ratio every preset time interval to achieve the effect of expanding the area range of the target area with the increase of the display duration of the target area.

The enlargement ratio and the time interval can be set in advance according to actual needs, which are not limited in the present disclosure.

In step S130, a target scene image is displayed in the target area, a display size of the target scene image being enlarged with expansion of the area range of the target area.

In the embodiment of the present disclosure, after the electronic device displays a target area on the initial scene image, a target scene image can be displayed in the target area, and a display size of the target scene image can be enlarged with expansion of the area range of the target area, so that the effect of scene traversal on the target scene image can be achieved.

In the embodiment of the present disclosure, the target scene image may be an image of a destination scene of the scene transfer.

In some embodiments, the target scene image may be a preset image.

Optionally, the target scene image may comprise any one of a static image or a dynamic image, which is not limited here.

Optionally, the target scene image may comprise any one of a two-dimensional image or a three-dimensional image, which is not limited here.

In an example, before step S130, the image display method may further comprise: in a case where the target scene image is a two-dimensional image, performing three-dimensional reconstruction on the target scene image to obtain a three-dimensional target scene image.

Accordingly, the displaying of the target scene image in the target area in step S130 may specifically comprise displaying the three-dimensional target scene image in the target area.

Specifically, in a case where the target scene image is a two-dimensional image, the electronic device can further perform three-dimensional reconstruction on the target scene image using a preset three-dimensional reconstruction algorithm to reconstruct the two-dimensional target scene image into a three-dimensional target scene image, and then display the three-dimensional target scene image in the target area to improve the realism of the destination scene in the portal, and further improve the display effect.

In the embodiment of the present disclosure, optionally, the target area can be completely covered by the target scene image. As shown in FIG. 3, the elliptical area 302 can be completely covered by a scene image of a park scene, making the "portal" effect of the scene image of the park scene more realistic.

In some embodiments, an image size of the target scene image can be determined according to a rectangular size of a minimum bounding rectangle of the target area.

Specifically, the electronic device can first determine a rectangular size of a minimum bounding rectangle of the target area, then convert an image size of the target scene image to the rectangular size to obtain a converted target scene image, and then overlap an image center point of the converted target scene image with a rectangle center point of the minimum bounding rectangle, and clip the converted target scene image according to the display size and shape of the target area to obtain a clipped target scene image, and finally display the clipped target scene image in the target area so that the target area can be completely covered by the target scene image.

In other embodiments, the displaying of the target scene image in the target area in step S130 may specifically comprise: displaying a target display area of the target scene image in the target area, the target display area being determined according to the area range of the target area.

In an example, in a case where the image size of the target scene image is the same as an interface size of the target interactive interface, the electronic device can first determine a relative area range where the target area is located in the target interactive interface based on the shape, display size and display position of the target area, and then take the relative area range as a target display area, display image content of the target scene image that is within the target display area while hiding image content of the target scene image that is not within the target display area, so that the target area can be completely covered by the target scene image.

In another example, in a case where the image size of the target scene image is different from the interface size of the target interactive interface, the electronic device can first convert the image size of the target scene image to the interface size of the target interactive interface to obtain a converted target scene image, and then determine a relative area range where the target area is located in the target interactive interface based on the shape, display size and display position of the target area, taking the relative area range as a target display area, and finally display image content of the converted target scene image that is within the target display area while hiding image content of the converted target scene image that is not within the target display area, so that the target area can be completely covered by the target scene image.

In an embodiment of the present disclosure, optionally, the electronic device may be preset with an enlargement ratio of a display size of the target scene image. After the target area is displayed, the electronic device may enlarge the display size of the target scene image according to the enlargement ratio every preset time interval to achieve the effect of enlarging the display size of the target scene image with the expansion of the area range of the target area.

The enlargement ratio and the time interval can be set in advance according to actual needs, which are not specifically limited here.

In some embodiments, in a case where the content image displayed in the target area remains unchanged, the image size of the target scene image can be determined according to a rectangle size of a minimum bounding rectangle of the target area, and an enlargement ratio of the display size of the target scene image can be set to be the same as an enlargement ratio of the area range of the target area, so that the target scene image can be enlarged with the expansion of the area range of the target area.

In other embodiments, in a case where the image content displayed in the target area varies, the target display area of the target scene image displayed in the target area can be determined according to the area range of the target area, and an enlargement ratio of the target display area of the target scene image can be set to be the same as an enlargement ratio of the area range of the target area, so that the image content displayed by the target scene image is more and more, the hidden image content is less and less, that is, the target display area of the target scene image is enlarged with the expansion of the area range of the target area.

When the target area is expanded, the size of the target scene image remains unchanged (in which case, the size of the target scene image may be the same as the size of the target interactive interface), or an expansion speed of the target scene image is greater than an expansion speed of the target area.

In some embodiments of the present disclosure, a transparency of the target scene image may also be decreased with the expansion of the area range of the target area; and/or an image angle of the target scene image may also be rotated with the expansion of the area range of the target area.

In some embodiments, in step S130, the electronic device can display the target scene image in the target area according to a preset initial transparency.

The initial transparency can be any transparency value less than 1 and greater than 0 that is preset as needed, which is not limited here.

Optionally, the electronic device may be preset with a decrease ratio of the transparency of the target scene image. After the target scene image is displayed, the electronic device may decrease the transparency of the target scene image according to the decrease ratio every preset time interval to achieve the effect of decreasing the transparency of the target scene image with the expansion of the area range of the target area.

The decrease ratio and the time interval can be set in advance according to actual needs, which are not limited here.

In other embodiments, in step S130, the electronic device can display the target scene image in the target area according to a preset initial angle.

The initial angle can be any angle that is preset as needed, which is not limited here.

Optionally, the electronic device may be preset with a rotation angle of the target scene image. After the target scene image is displayed, the electronic device may rotate the image angle of the target scene image by the rotation ratio every preset time interval to achieve the effect of rotating the image angle of the target scene image with the expansion of the area range of the target area.

The rotation angle and the time interval can be set in advance according to actual needs, which are not limited here.

In the embodiment of the present disclosure, in the process of displaying an initial scene image in the target interactive interface, in response to a first trigger operation, a target area can be displayed on the initial scene image, and a target scene image can be displayed in the target area, so that the user can see the target scene image through the target area in the initial scene image, thereby achieving a "portal" effect. In addition, the area range of the target area can be expanded with the increase of the display duration of the target area, and the display size of the target scene image can be enlarged with the expansion of the area range of the target area, so that the user can see the effect of scene transfer from the initial scene image to the target scene image. Moreover, the scene transfer is achieved by gradually expanding the area range of the target area and gradually enlarging the display size of the target scene image, which makes the scene transfer process more natural. Therefore, the user's sense of substitution can be enhanced in the process of the scene transfer from the initial scene image to the target scene image, thereby improving the display effect.

In other embodiments of the present disclosure, after step S130, the image display method may further comprise: stopping display of the initial scene image in the target interactive interface in a case where the area range of the target area is expanded to completely cover the target interactive interface.

Specifically, the electronic device can determine the end of the scene traversal process in a case where the area range of the target area is expanded to completely cover the target interactive interface, and then stop displaying the initial scene image in the target interactive interface, and display the target scene image in the target interactive interface in full screen.

Optionally, in a case where the transparency of the target scene image decreases with the expansion of the area range of the target area, the electronic device can display the target scene image with a transparency of 0 in full screen in the target interactive interface in a case where the area range of the target area is expanded to completely cover the target interactive interface.

Optionally, in a case where the image angle of the target scene image is rotated with the expansion of the area range of the target area, the electronic device can display the target scene image with an image angle of 0 in full screen in the target interactive interface.

Referring to FIG. 3, after the electronic device superimposes and displays the elliptical area 302 displaying the scene image of a park scene on the real-time image of a classroom scene displayed in the shooting preview interface 301, the elliptical area 302 and the scene image of the park scene can be synchronously enlarged as the display duration increases until the area range of the elliptical area 302 is expanded to completely cover the shooting preview interface 301. At this point, the scene image of the park scene is displayed in full screen in the shooting preview interface 301, and the display of the real-time image of the classroom scene is stopped.

Therefore, in an embodiment of the present disclosure, a scene transfer effect in the form of spatial transfer can be simulated using a "portal" appearing as a "magic circle", thereby enhancing the sense of interaction and substitution in the scene transfer process, as if the user enters the "portal" to reach another scene, thereby enriching the display effect with simple and easy interactive operations.

In another embodiment of the present disclosure, in order to further improve the display effect, the target scene image can also be a local image selected by the user, that is, the target scene image can be specified by the user.

In some embodiments of the present disclosure, the user can select a target scene image before the electronic device detects the first trigger operation.

Referring to FIG. 1, in these embodiments, optionally, after step S110 and before step S120, the electronic device can display a plurality of local images, and the user can select a target scene image from the local images displayed by the electronic device.

In an example, after the electronic device displays the initial scene image in the target interactive interface and before the first trigger operation is detected in the target interactive interface, the electronic device may directly obtain a plurality of local images from a local album and superimpose and display the plurality of local images on the initial scene image displayed in the target interactive interface.

Optionally, the electronic device may superimpose and display a plurality of local images on a bottom of the initial scene image.

In another example, after the electronic device displays the initial scene image in the target interactive interface and before the first trigger operation is detected in the target interactive interface, the electronic device may display an album icon and the user may click the album icon to trigger the electronic device to obtain a plurality of local images from a local album and superimpose and display the plurality of local images on the initial scene image displayed in the target interactive interface.

Optionally, the electronic device may superimpose and display a plurality of local images on a bottom of the initial scene image.

In these embodiments, after a target area is displayed, the electronic device can directly display a target scene image in the target area and start timing a display duration of the target area, so that an area range of the target area can be expanded with an increase of the display duration of the target area, while a display size of the target scene image is enlarged with the expansion of the area range of the target area.

In other embodiments of the present disclosure, the user can select a target scene image after the electronic device displays the target area.

Referring to FIG. 1, in these embodiments, optionally, after step S120 and before step S130, the electronic device may display a plurality of local images, and the user may select a target scene image from the local images displayed by the electronic device.

In an example, after the electronic device displays a target area on the initial scene image and before the target scene image is displayed in the target area, the electronic device may directly obtain a plurality of local images from a local album and superimpose and display the plurality of local images on the initial scene image displayed in the target interactive interface.

Optionally, the electronic device may superimpose and display a plurality of local images on the bottom of the initial scene image.

In another example, after the electronic device displays the target area on the initial scene image and before the target scene image is displayed in the target area, the electronic device may display an album icon and the user may click the album icon to trigger the electronic device to obtain a plurality of local images from a local album and superimpose and display the plurality of local images on the initial scene image displayed in the target interactive interface.

Optionally, the electronic device may superimpose and display a plurality of local images on the bottom of the initial scene image.

In these embodiments, after a target area is displayed, the electronic device can wait for the user to select a target scene image, and after the user selects the target scene image, display the target scene image in the target area, and then start timing the display duration of the target area, so that the area range of the target area can be expanded with the increase of the display duration of the target area, while the display size of the target scene image is enlarged with the expansion of the area range of the target area.

Therefore, in the embodiment of the present disclosure, the user can select the scene image of a destination scene for the scene traversal according to the user's preference, which makes the scene traversal effect more flexible and can improve the display effect.

In another implementation of the present disclosure, in order to further improve the display effect, multiple alternative "portals" can be provided to the user to achieve the effect of multi-scene traversal.

Returning to FIG. 1, in these embodiments, optionally, after the first trigger operation is detected in the target interactive interface in step S120 and before the target area is displayed on the initial scene image in step S120, the image display method may further comprise: displaying a plurality of alternative areas on the initial scene image; displaying an alternative scene image corresponding to each of the plurality of alternative areas in the each of the plurality of alternative areas; using an alternative area triggered by a second trigger operation as the target area in response to the second trigger operation; and using the alternative scene image displayed in the target area as the target scene image.

Specifically, in response to the first trigger operation, the electronic device can superimpose and display a plurality of alternative areas on the initial scene image displayed in the target interactive interface, and display alternative scene images in one-to-one correspondence with the alternative areas, thereby achieving the effect of displaying a plurality of "portals" to different destination scenes on the actual scene image. The user can enter a second trigger operation on the plurality of alternative areas to select an alternative area to be triggered, enabling the electronic device to take the alternative area triggered by the second trigger operation as a target area, and an alternative scene image displayed in the target area as a target scene image. Then, the target area is used as a "portal" to be triggered, and the scene image displayed in the target area is used as the target scene image of the destination scene of the scene traversal. After the electronic device determines the target area and target scene image, the electronic device can display the target area on the initial scene image, and directly display the target scene image in the target area, and start timing the display duration of the target area after displaying the target scene image, so that the area range of the target area can be expanded with the increase of the display duration of the target area, and the display size of the target scene image is enlarged with the expansion of the area range of the target area.

Each alternative area can be completely covered by a corresponding alternative scene image.

Furthermore, a method of covering an alternative area with an alternative scene image is similar to a method of covering a target area with a target scene image, which will not be repeated here.

In an embodiment of the present disclosure, the second trigger operation may be configured to select a target area from the alternative areas.

In some embodiments, in a case where the initial scene image is the real-time visual scene image displayed by the electronic device in the shooting preview interface, the user can make various hand gestures in the real environment where the electronic device is located. In this case, the real-time visual scene image collected by the electronic device can comprise the hand gesture made by the user, that is, the initial scene image displayed by the electronic device in the shooting preview interface may also comprise the hand gesture made by the user.

In these embodiments, the second trigger operation may comprise a second user hand gesture displayed in the shooting preview interface, wherein the second user hand gesture can be a hand gesture made by the user in a real environment for selecting a specified alternative area.

Optionally, the second user hand gesture may be a hand gesture made by the user in front of the camera of the electronic device for pointing at any alternative area, touching any alternative area, etc., which is not limited here.

In other embodiments, in a case where the initial scene image is any scene image being displayed by the electronic device, the user can enter a second trigger operation in the target interactive interface. In this case, the electronic device can detect the second trigger operation made by the user in the target interactive interface and received by a touch screen of the electronic device, and display a plurality of alternative areas on the initial scene image after the second trigger operation is detected.

In these embodiments, the second trigger operation may be a hand gesture of the user, such as a click, long press or double click, etc., performed on any alternative area on the touch screen of the electronic device, which is not limited here.

Figure 4:
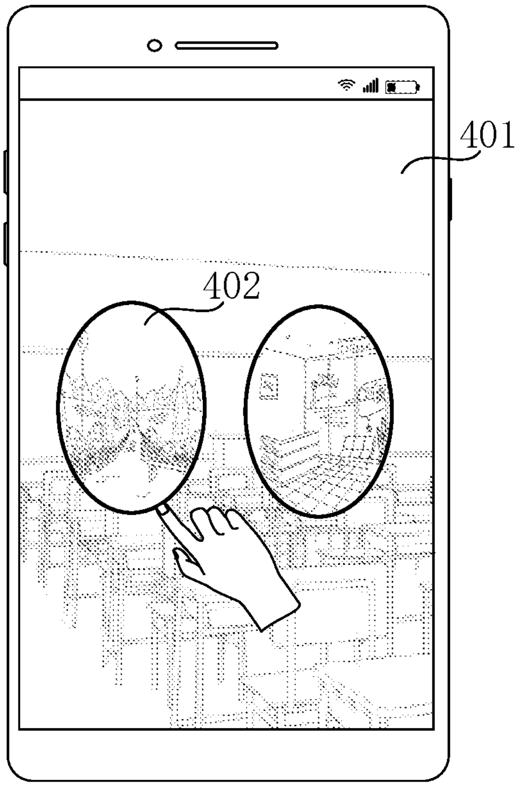
FIG. 4 is a schematic diagram of still another shooting preview interface provided by an embodiment of the present disclosure.

FIG. 4 is a schematic diagram of still another shooting preview interface provided by an embodiment of the present disclosure.

As shown in FIG. 4, after detecting a hand gesture of the user drawing an elliptical trajectory, the electronic device can display a real-time image of a classroom scene in the shooting preview interface 401, and superimpose two elliptical areas 402 on the real-time image of the classroom scene in the shooting preview interface 401 according to the elliptical trajectory drawn by the user. One elliptical area 402 is covered with a scene image of a park scene, and the other elliptical area 402 is covered with a scene image of an airport scene.

The user can point with a finger at an elliptical area 402 to be selected in the classroom scene in front of the camera of the electronic device, allowing the electronic device to collect the hand gesture of the user pointing at the elliptical area 402 to be selected in real time, and allowing the real-time image displayed in the shooting preview interface 401 to comprise the hand gesture of the user pointing at the elliptical area 402 to be selected. In addition, the electronic device can perform real-time detection on the real-time image displayed in the shooting preview interface 401. After detecting the hand gesture of the user pointing at the elliptical area 402 to be selected, the interface shown in FIG. 3 is displayed, in which the elliptical area 402 covered with the scene image of the park scene is retained, and the display of the elliptical area 402 covered with the scene image of the airport scene is stopped.

In some embodiments, the alternative scene image may be a preset scene image.

In some embodiments of the present disclosure, the user can select an alternative scene image before the electronic device detects the first trigger operation.

In these embodiments, optionally, after the electronic device detects a first trigger operation in the target interactive interface and before a plurality of alternative areas are displayed on the initial scene image, the electronic device can display a plurality of local images, and the user can select an alternative scene image from the local images displayed by the electronic device.

In other embodiments of the present disclosure, the user can select an alternative scene image after the electronic device displays the alternative areas.

In these embodiments, optionally, after the electronic device displays a plurality of alternative areas on the initial scene image and before an alternative scene image corresponding to each alternative area is displayed in the each alternative area, the electronic device can display a plurality of local images, and the user can select an alternative scene image from the local images displayed by the electronic device.

It should be noted that a method for the electronic device to display local images for selecting an alternative scene image is similar to a method for displaying local images for selecting a target scene image, which will not be repeated here.

In some embodiments of the present disclosure, the number of alternative areas may be any number preset as needed, which is not limited here.

In these embodiments, a display position and a display size of the alternative area may be a position and a size preset as needed, which are not limited here. A shape of the alternative area can be a preset shape as needed, or may be a trajectory shape drawn by the user, which is not limited here.

In these embodiments, optionally, the number of alternative scene images selected by the user may be the same as the number of the alternative areas.

In other embodiments of the present disclosure, the number of alternative areas may be determined according to the number of alternative scene images selected by the user.

In these embodiments, display positions and display sizes of the alternative areas can be determined according to the number of alternative scene images, that is, the electronic device can adjust the display positions and display sizes of the alternative areas according to the number of alternative scene images to ensure that all alternative areas are displayed in the target interactive interface. The shapes of the alternative areas can be preset shapes as needed, or may be trajectory shapes drawn by the user, which are not limited here.

In these embodiments, optionally, the electronic device may determine the number of alternative scene images selected by the user, and display alternative areas with the same number as the number of alternative scene images.

Therefore, in the embodiment of the present disclosure, multiple alternative "portals" can be provided for the user, and the user can select a scene image of a destination scene of the scene traversal from the multiple alternative "portals" according to the user's own preference, which makes the scene traversal effect more flexible and can achieve the effect of multi-scene traversal, and thereby improving the display effect.

An embodiment of the present disclosure further provides an image display apparatus for implementing the above image display method, which will be described with reference to FIG. 5 below. In the embodiment of the present disclosure, the image display apparatus may be an electronic device. The electronic device may comprise a mobile phone, a tablet computer, a desktop computer, a notebook computer, a vehicle-mounted terminal, a wearable electronic device, a VR device, an all-in-one computer, a smart home device, or other device with a communication function.

Figure 5:
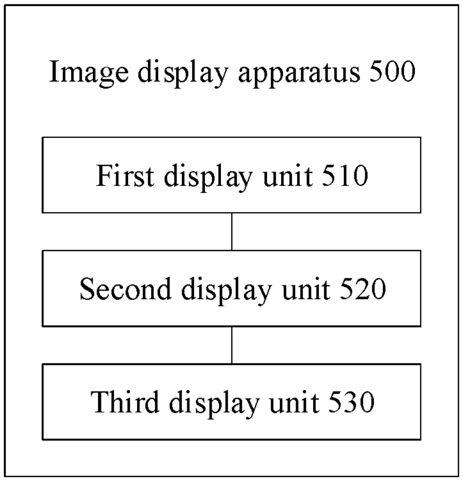
FIG. 5 is a schematic structural diagram of an image display apparatus provided by an embodiment of the present disclosure.

FIG. 5 is a schematic structural diagram of an image display apparatus provided by an embodiment of the present disclosure.

As shown in FIG. 5, the image display apparatus 500 comprises a first display unit 510, a second display unit 520, and a third display unit 530.

The first display unit 510 is configured to display an initial scene image in a target interactive interface.

The second display unit 520 is configured to display a target area on the initial scene image in response to a first trigger operation, an area range of the target area being expanded with an increase of a display duration of the target area.

The third display unit 530 is configured to display a target scene image in the target area, a display size of the target scene image being enlarged with expansion of the area range of the target area.

In the embodiment of the present disclosure, in the process of displaying an initial scene image in the target interactive interface, in response to a first trigger operation, a target area can be displayed on the initial scene image, and a target scene image can be displayed in the target area, so that the user can see the target scene image through the target area in the initial scene image, thereby achieving a "portal" effect. In addition, the area range of the target area can be expanded with the increase of the display duration of the target area, and the display size of the target scene image can be enlarged with the expansion of the area range of the target area, so that the user can see the effect of scene transfer from the initial scene image to the target scene image. Moreover, the scene transfer is achieved by gradually expanding the area range of the target area and gradually enlarging the display size of the target scene image, which makes the scene transfer process more natural. Therefore, the user's sense of substitution can be enhanced in the process of the scene transfer from the initial scene image to the target scene image, thereby improving the display effect.

In some embodiments of the present disclosure, the image display apparatus 500 further comprises a fourth display unit configured to, after the target scene image is displayed, stop display of the initial scene image in the target interactive interface in a case where the area range of the target area is expanded to completely cover the target interactive interface.

In some embodiments of the present disclosure, a transparency of the target scene image is decreased with the expansion of the area range of the target area; and/or an image angle of the target scene image is rotated with the expansion of the area range of the target area.

In some embodiments of the present disclosure, the target interactive interface comprises a shooting preview interface, and the first trigger operation comprises a first user hand gesture displayed in the shooting preview interface; and/or the initial scene image comprises a real-time visual scene image; and/or the target scene image comprises a local image selected by a user.

In an embodiment of the present disclosure, the first user hand gesture is configured to draw a target trajectory.

Accordingly, the image display apparatus 500 may further comprise a first processing unit configured to determine a display parameter of the target area according to a trajectory parameter of the target trajectory before the target area is displayed.

Accordingly, the second display unit 520 may be further configured to display the target area on the initial scene image according to the display parameter of the target area.

In some embodiments of the present disclosure, the display parameter of the target area comprises at least one of a shape, a display position, or a display size of the target area.

In some embodiments of the present disclosure, the target area further comprises an area boundary pattern, wherein the area boundary pattern has a dynamic effect.

In some embodiments of the present disclosure, the target area is completely covered by the target scene image.

In some embodiments of the present disclosure, an image size of the target scene image is determined according to a rectangular size of a minimum bounding rectangle of the target area.

In some embodiments of the present disclosure, the third display unit 530 is further configured to display a target display area of the target scene image in the target area, the target display area being determined according to the area range of the target area.

In some embodiments of the present disclosure, the target scene image comprises any one of a static image or a dynamic image.

In some embodiments of the present disclosure, the image display apparatus 500 further comprises a second processing unit configured to, before the target scene image is displayed, in a case where the target scene image is a two-dimensional image, perform three-dimensional reconstruction on the target scene image to obtain a three-dimensional target scene image.

Accordingly, the third display unit 530 may be further configured to display the three-dimensional target scene image in the target area.

In some embodiments of the present disclosure, the image processing apparatus 500 further comprises a fifth display unit, a sixth display unit, a third processing unit, and a fourth processing unit.

The fifth display unit is configured to display a plurality of alternative areas on the initial scene image after the first trigger operation is detected and before the target area is displayed.

The sixth display unit is configured to display an alternative scene image corresponding to each of the plurality of alternative areas in the each of the plurality of alternative areas.

The third processing unit is configured to use an alternative area triggered by a second trigger operation as the target area in response to the second trigger operation.

The fourth processing unit is configured to use the alternative scene image displayed in the target area as the target scene image.

It should be noted that the image display apparatus 500 shown in FIG. 5 can perform the various steps of the method embodiments shown in FIGS. 1 to 4, and implement the various processes and effects of the method embodiments shown in FIGS. 1 to 4, which will not be repeated herein.

An embodiment of the present disclosure further provides an image display device, wherein the image display device may comprise a processor and a memory configured to store executable instructions. The processor is configured to read the executable instructions from the memory and perform the executable instructions to implement the image display method described in the above embodiments.

Figure 6:
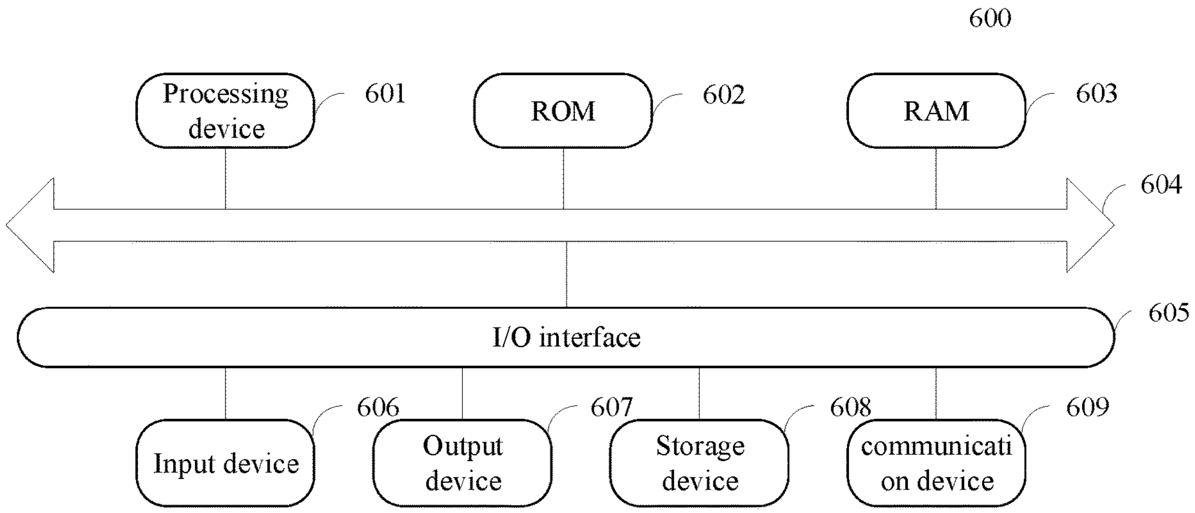
FIG. 6 is a schematic structural diagram of an image display device provided by an embodiment of the present disclosure.

FIG. 6 is a schematic structural diagram of an image display device provided by an embodiment of the present disclosure. Referring to FIG. 6, a schematic structural diagram of an image display device 600 suitable for implementing the embodiments of the present disclosure is shown.

In the embodiment of the present disclosure, the image display device 600 may be an electronic device. The electronic device may comprise, but is not limited to, a mobile terminal, such as a mobile phone, a notebook computer, a digital broadcast receiver, a PDA (personal digital assistant), a PAD (tablet computer), a PMP (portable multimedia player), a vehicle-mounted terminal (such as a vehicle-mounted navigation terminal), a wearable device, etc., or a fixed terminal such as a digital TV, a desktop computer, a smart home device, etc.

It should be noted that the image display device 600 shown in FIG. 6 is only an example, and should not bring any limitation to the function and scope of use of the embodiments of the present disclosure.

As shown in FIG. 6, the image display device 600 may comprise a processing device (such as a central processing unit, a graphics processor, etc.) 601, which can perform various appropriate actions and processes according to a program stored in a read only memory (ROM) 602, or a program loaded from a storage device 608 into a random access memory (RAM) 603. In RAM 603, various programs and data required for the operation of the image display device 600 are also stored. The processing device 601, the ROM 602 and the RAM 603 are connected to each other through bus 604. An input/output (I/O) interface 605 is also connected to the bus 604.

Generally, the following devices can be connected to I/O interface 605: an input device 606 comprising, for example, a touch screen, a touch pad, a keyboard, a mouse, a camera, a microphone, an accelerometer, a gyroscope, etc.; an output device 607 comprising a liquid crystal display (LCD), a speaker, a vibrator, etc.; a storage device 608 such as a magnetic tape, a hard disk, etc.; and a communication device 609. The communication device 609 enables the image display device 600 to communicate wirelessly or perform wired communication with other devices to exchange data. Although FIG. 6 shows the image display device 600 with various components, it should be understood that it is not required to implement or have all of these components. Alternatively, more or fewer components can be implemented or provided.

An embodiment of the present disclosure further provides a computer readable storage medium having a computer program stored thereon, wherein the computer program, when executed by a processor, causes the processor to implement the image display method described in the above embodiments.

In particular, according to an embodiment of the present disclosure, the processes described above with reference to the flowchart can be implemented as a computer software program. For example, an embodiment of the present disclosure comprises a computer program product, wherein the computer program product comprises a computer program carried on a non-transitory computer readable medium, and containing program code for executing the method shown in the flowchart. In such an embodiment, the computer program may be downloaded and installed from the network through the communication device 609, or installed from the storage device 608, or from the ROM 602. When the computer program is executed by the processing device 601, the above functions defined in the image display method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, wherein the program can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, and the computer readable signal medium can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP, and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the image display device described above; or it may exist alone without being assembled into the image display device.

The above computer-readable medium carries one or more programs that, when executed by the image display device, cause the image display device to: display an initial scene image in a target interactive interface; display a target area on the initial scene image in response to a first trigger operation, an area range of the target area being expanded with an increase of a display duration of the target area; and display a target scene image in the target area, a display size of the target scene image being enlarged with expansion of the area range of the target area.

In an embodiment of the present disclosure, the computer program code for executing operations of the present disclosure may be written in one or more program design languages or a combination thereof, the program design languages comprising, but not limited to, object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the case involving a remote computer, the remote computer may be connected to the user computer through various kinds of networks, comprising local area network (LAN) or wide area network (WAN), or connected to an external computer (for example using an internet service provider via Internet).

The flowcharts and block diagrams in the accompanying drawings illustrate the architecture, functionality, and operation of some possible implementations of systems, methods and computer program products according to various embodiments of the present disclosure. In this regard, each block in the flowchart or block diagrams may represent a module, program segment, or portion of code, wherein the module, program segment, or portion of code comprises one or more executable instructions for implementing the specified logical functions. It should also be noted that, in some alternative implementations, the functions noted in a different order than those noted in the drawings. For example, two blocks shown in succession may be executed substantially in parallel, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or operations, or combinations of special purpose hardware and computer instructions.

The units involved in the embodiments described in the present disclosure can be implemented in software or hardware. Names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium.

The machine-readable medium may comprise, but is not limited to, an electronic, magnetic, optical, electromagnetic, infrared, or semiconductor system, apparatus, or device, or any suitable combination of thereof. More specific examples of the More machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

An embodiment of the present disclosure further provides a computer program, comprising: instructions that, when executed by a processor, cause the processor to perform the image display method described above.

An embodiment of the present disclosure further provides a computer program product comprising instructions that, when executed by a processor, cause the processor to perform the image display method described above.

The above description is only preferred embodiments of the present disclosure and an explanation of the applied technical principles. Those skilled in the art should understand that the scope of disclosure involved in the disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An image display method, comprising:

displaying an initial scene image in a target interactive interface;

displaying a target area on the initial scene image in response to a first trigger operation, an area range of the target area being expanded with an increase of a display duration of the target area; and displaying a target scene image in the target area, a display size of the target scene image being enlarged with expansion of the area range of the target area;

wherein after detecting the first trigger operation in the target interactive interface and before displaying the target area on the initial scene image, the method further comprises:

displaying a plurality of alternative areas on the initial scene image;

displaying an alternative scene image corresponding to each of the plurality of alternative areas in the each of the plurality of alternative areas;

using an alternative area triggered by a second trigger operation as the target area in response to the second trigger operation; and using the alternative scene image displayed in the target area as the target scene image.

2. The image display method according to claim 1, further comprising:

after the target scene image is displayed in the target area, stopping display of the initial scene image in the target interactive interface in a case where the area range of the target area is expanded to completely cover the target interactive interface.

3. The image display method according to claim 1, wherein:

a transparency of the target scene image is decreased with the expansion of the area range of the target area; and/or an image angle of the target scene image is rotated with the expansion of the area range of the target area.

4. The image display method according to claim 1, wherein:

the target interactive interface comprises a shooting preview interface, and the first trigger operation comprises a first user hand gesture displayed in the shooting preview interface.

5. The image display method according to claim 4, wherein:

the first user hand gesture is configured to draw a target trajectory; and the method further comprises: determining a display parameter of the target area according to a trajectory parameter of the target trajectory before displaying the target area on the initial scene image;

wherein the displaying of the target area on the initial scene image comprises: displaying the target area on the initial scene image according to the display parameter of the target area.

6. The image display method according to claim 5, wherein the display parameter of the target area comprises at least one of a shape, a display position, or a display size of the target area.

7. The image display method according to claim 1, wherein the target area further comprises an area boundary pattern having a dynamic effect.

8. The image display method according to claim 1, wherein the target area is completely covered by the target scene image.

9. The image display method according to claim 8, wherein an image size of the target scene image is determined according to a rectangular size of a minimum bounding rectangle of the target area.

10. The image display method according to claim 8, wherein the displaying of the target scene image in the target area comprises:

displaying a target display area of the target scene image in the target area, the target display area being determined according to the area range of the target area.

11. The image display method according to claim 1, wherein the target scene image comprises any one of a static image or a dynamic image.

12. The image display method according to claim 1, further comprising:

before displaying the target scene image in the target area, in a case where the target scene image is a two-dimensional image, performing three-dimensional reconstruction on the target scene image to obtain a three-dimensional target scene image;

wherein the displaying of the target scene image in the target area comprises displaying the three-dimensional target scene image in the target area.

13. The image display method according to claim 1, wherein:

the initial scene image comprises a real-time visual scene image; and/or the target scene image comprises a local image selected by a user.

14. An image display device, comprising:

a memory configured to store executable instructions; and a processor configured to read the executable instructions from the memory and perform the executable instructions to:

display an initial scene image in a target interactive interface;

display a target area on the initial scene image in response to a first trigger operation, an area range of the target area being expanded with an increase of a display duration of the target area; and display a target scene image in the target area, a display size of the target scene image being enlarged with expansion of the area range of the target area;

wherein the processor is further configured to perform the executable instructions to, after detecting the first trigger operation in the target interactive interface and before displaying the target area on the initial scene image:

display a plurality of alternative areas on the initial scene image;

display an alternative scene image corresponding to each of the plurality of alternative areas in the each of the plurality of alternative areas;

use an alternative area triggered by a second trigger operation as the target area in response to the second trigger operation; and use the alternative scene image displayed in the target area as the target scene image.

15. The image display device according to claim 14, wherein the processor is further configured to perform the executable instructions to, after the target scene image is displayed in the target area, stop display of the initial scene image in the target interactive interface in a case where the area range of the target area is expanded to completely cover the target interactive interface.

16. The image display device according to claim 14, wherein:

a transparency of the target scene image is decreased with the expansion of the area range of the target area; and/or an image angle of the target scene image is rotated with the expansion of the area range of the target area.

17. A non-transitory computer-readable storage medium having a computer program stored thereon, wherein the computer program, when executed by a processor, causes the processor to:

display an initial scene image in a target interactive interface;

display a target area on the initial scene image in response to a first trigger operation, an area range of the target area being expanded with an increase of a display duration of the target area; and display a target scene image in the target area, a display size of the target scene image being enlarged with expansion of the area range of the target area;

wherein the computer program, when executed by the processor, further causes the processor to, after detecting the first trigger operation in the target interactive interface and before displaying the target area on the initial scene image:

display a plurality of alternative areas on the initial scene image;

display an alternative scene image corresponding to each of the plurality of alternative areas in the each of the plurality of alternative areas;

use an alternative area triggered by a second trigger operation as the target area in response to the second trigger operation; and use the alternative scene image displayed in the target area as the target scene image.

18. The non-transitory computer-readable storage medium according to claim 17, wherein the computer program, when executed by the processor, further causes the processor to, after the target scene image is displayed in the target area, stop display of the initial scene image in the target interactive interface in a case where the area range of the target area is expanded to completely cover the target interactive interface.

19. The non-transitory computer-readable storage medium according to claim 17, wherein:

a transparency of the target scene image is decreased with the expansion of the area range of the target area; and/or an image angle of the target scene image is rotated with the expansion of the area range of the target area.

* * * * *